United States Patent [19]

Henderson

[11] Patent Number: 5,017,181

[45] Date of Patent: May 21, 1991

[54] BELT TENSIONER, KIT THEREFOR AND METHODS OF MAKING THE SAME

[75] Inventor: Dewey D. Henderson, Springfield, Mo.

[73] Assignee: Dayco Products, Inc., Dayton, Ohio

[21] Appl. No.: 591,657

[22] Filed: Oct. 2, 1990

Related U.S. Application Data

[62] Division of Ser. No. 513,635, Apr. 24, 1990, Pat. No. 4,981,461, which is a division of Ser. No. 443,990, Nov. 30, 1989, Pat. No. 4,950,207, which is a division of Ser. No. 364,284, Jun. 12, 1989, Pat. No. 4,902,267.

[51] Int. Cl.⁵ .............................................. F16H 7/12
[52] U.S. Cl. .................................................... 474/133
[58] Field of Search .................. 474/101, 109–111, 474/113–117, 133, 135, 136, 138

[56] References Cited

U.S. PATENT DOCUMENTS

| | | | |
|---|---|---|---|
| 4,596,538 | 6/1986 | Henderson | 474/135 |
| 4,661,087 | 4/1987 | Henderson | 474/135 |
| 4,728,318 | 3/1988 | Henderson | 474/135 |

*Primary Examiner*—Thuy M. Bui
*Attorney, Agent, or Firm*—Joseph V. Tassone

[57] ABSTRACT

The combination of a belt tensioner and a support therefor, a belt tensioner, a kit therefor and methods of making the same are provided, the combination comprising a belt tensioner mounted to a support by a single bolt and having a removable pin extending therefrom and being received in an offset opening in the support to orient the tensioner relative to the support and to prevent rotation of the tensioner on the bolt, the housing of the tensioner having a plurality of mounting arrangements each being adapted to have a removable pin attached thereto for being received in an opening of a support so that the tensioner can be mounted to a different support by the single bolt and the removable pin.

17 Claims, 2 Drawing Sheets

BELT TENSIONER, KIT THEREFOR AND METHODS OF MAKING THE SAME

CROSS REFERENCE TO RELATED APPLICATIONS

This application is a divisional patent application of its copending parent patent application, Ser. No. 513,635, filed Apr. 24, 1990, now U.S. Pat. No. 4,981,461 which, in turn, is a divisional patent application of its copending parent patent application, Ser. No. 443,990, filed Nov. 30, 1989, now U.S. Pat. No. 4,950,207, which in turn, is a divisional patent application of its copending parent patent application, Ser. No. 364,284, filed June 12, 1989, now U.S. Pat. No. 4,902,267.

BACKGROUND OF THE INVENTION

1. Field of the Invention

This invention relates to a new tensioner for an endless power transmission belt or the like, a new kit containing such a tensioner and to new methods of making such a tensioner and such a kit.

2. Prior Art Statement

It is known to provide the combination of a support means having a mounting surface means, a single bolt means, and a belt tensioner having a housing means secured to the support means in abutting relation to the mounting surface means thereof by the single bolt means that is carried by the housing means and the support means, the support means having opening means interrupting the mounting surface means in offset relation to the bolt means, the housing means having a certain removable pin means extending therefrom and being received in the opening means of the support means to orient the tensioner relative to the support means and to prevent rotation of the housing means on the bolt means. Such prior known pin means has a threaded shank portion threadedly disposed in an internally threaded opening in the housing means so that an enlarged head of the pin means is received in the offset opening of the support means.

It is also known to provide a tensioner for a power transmission belt that is adapted to be operated in an endless path, the tensioner comprising a support means for being fixed relative to the belt, a belt engaging means carried by the support means and being movable relative thereto, first spring means operatively associated with the support means and the belt engaging means for urging the belt engaging means relative the the support means and against the belt with a force to tension the belt, and a frictional dampening means operatively associated with the support means and the belt engaging means to dampen the movement of the belt engaging means relative to the support means and in at least one direction of movement thereof, the dampening means having a longitudinal axis, the support means comprising a shaft means having a longitudinal axis and being fixed from movement relative to the belt engaging means, the belt engaging means having a portion thereof being rotatably carried by the shaft means so as to rotate relative to the shaft means, the dampening means comprising a pair of frictionally engaging first and second parts with the first part comprising an annular pad of friction material that is coaxially disposed and axially movable on the shaft means relative to the second part, and second spring means urging the first part against the second part with a certain spring force, the first part of the dampening means having guide means thereon, the support means comprising an end cap having opening means therein that receive the guide means therein to guide movement of the first part, the opening means having bearing means receiving the guide means therein. For example, see the U.S. Pat. No. 4,596,538 to Henderson.

SUMMARY OF THE INVENTION

It is one feature of this invention to provide a new belt tensioner having unique means for permitting the belt tensioner to be properly mounted and oriented to different support structure without requiring different belt tensioners respectively for the different support structures as in the aforementioned U.S. Pat. No. 4,596,538 whereby the tensioner of this invention is relatively universally mountable.

In particular, the belt tensioners as set forth in the aforementioned U.S. Pat. No. 4,596,538 each is adapted to be mounted to a support structure by a single bolt means that passes through a hollow shaft means of the belt tensioner and a cooperating opening in the support structure. In order to prevent the belt tensioner from rotating on that single mounting bolt means, the housing means of the tensioner has an extension that is received in an opening means in the support structure that is offset relative to the bolt means so as to properly orient the tensioner to the support structure as well as to prevent subsequent rotation of the tensioner on the single bolt means.

When prototypes of this prior known tensioner were being supplied, such extension of the housing was provided by forming a threaded opening in the housing means and threading therein a threaded shank portion of a pin means that has an enlarged head that comprises the extension thereof that is received in the opening means of the particular support structure to which that tensioner is intended to be mounted.

However, it was found, according to the teachings of this invention, that the housing means of such a tensioner can be provided with a plurality of threaded openings therein each being adapted to have the threaded shank portion of a particular pin means being received therein so as to permit that tensioner to be properly mounted and oriented to a particular support structure whereby the tensioner can be mounted to different support structure by merely selecting the proper threaded opening for the respective support structure.

In this manner, it was further found according to the teachings of this invention that a kit can be provided that will contain such a new belt tensioner of this invention together with a pin means and a set of instructions so that a user can be informed that if his particular automobile engine is a certain make and model, then that person is to mount that pin means in a certain one of the plurality of threaded openings in the housing means of the tensioner so when that person subsequently mounts that tensioner to the support structure of that person's particular engine, the pin means that has been positively attached to the housing means of the tensioner will have its enlarged head received in the offset opening means of the support structure in a manner that properly orients that tensioner to that particular engine.

For example, one embodiment of this invention provides a combination of a support means having a mounting surface means, a single bolt means, and a belt tensioner having a housing means secured to the support means in abutting relation to the mounting surface means thereof by the single bolt means that is carried by the housing means and the support means, the support means having opening means interrupting the mounting surface means in offset relation to the bolt means, the housing means having a certain removable pin means extending therefrom and being received in the opening means of the support means to orient the tensioner relative to the support means and to prevent rotation of the housing means on the bolt means, the housing means having a plurality of arrangements each being adapted to have a removable pin means attached thereto for being received in an opening means of the support means, the certain removable pin means being attached to one of the mounting arrangements.

It is another feature of this invention to provide a new tensioner for a power transmission belt that is adapted to be operated in an endless path, the tensioner having a unique end cap that permits the elimination of a separate bearing means that is provided in a prior known tensioner.

In particular, the prior known belt tensioner of the aforementioned U.S. Pat. No. 4,596,538 to Henderson, has a cast aluminum end cap that requires a separate bearing means to line the opening means in that end cap so that guide means of an annular pad of friction material can be moved axially relative thereto for frictionally dampening the movement of the belt engaging arm of the tensioner relative to the fixed support means thereof.

However, it was found according to the teachings of this invention, that the end cap can be formed substantially entirely of polymeric material and thereby provide its own bearing means so as to eliminate the need for a separate bearing liner means for the guide means of the dampening means.

For example, another embodiment of this invention provides a tensioner for a power transmission belt that is adapted to be operated in an endless path, the tensioner comprising a support means for being fixed relative to the belt, a belt engaging means carried by the support means and being movable relative thereto, first spring means operatively associated with the support means and the belt engaging means for urging the belt engaging means relative to the support means and against the belt with a force to tension the belt, and frictional dampening means operatively associated with the support means and the belt engaging means to dampen the movement of the belt engaging means relative to the support means in at least one direction of movement thereof, the dampening means having a longitudinal axis, the support means comprising a shaft means having a longitudinal axis and being fixed from movement relative to the belt engaging means, the belt engaging means having a portion thereof being rotatably carried by the shaft means so as to rotate relative to the shaft means, the dampening means comprising a pair of frictionally engaging first and second parts with the first part comprising an annular pad of friction material that is coaxially disposed and axially movable on the shaft means relative to the second part, and second spring means urging the first part against the second part with a certain spring force, the first part of the dampening means having guide means thereon, the support means comprising an end cap having opening means therein that receive the guide means therein to guide axial movement of the first part, the opening means having bearing means receiving the guide means therein, the end cap being formed of polymeric material and thereby also comprising the bearing means thereof.

Accordingly, it is an object of this invention to provide a new tensioner for a power transmission belt or the like that is adapted to be operated in an endless path, the tensioner of this invention having one or more of the novel features of this invention as set forth above or hereinafter shown or described.

Another object of this invention is to provide a new method of making such a tensioner, the method of this invention having one or more of the novel features of this invention as set forth above or hereinafter shown or described.

Another object of this invention is to provide a new combination of a support means, a single bolt means and a belt tensioner, the combination of this invention having one or more of the novel features of this invention as set forth above or hereinafter shown or described.

Another object of this invention is to provide a new method of making such a combination, the method of this invention having one or more of the novel features of this invention as set forth above or hereinafter shown or described.

Another object of this invention is to provide a new kit that contains the new belt tensioner of this invention, the kit of this invention having one or more of the novel features of this invention as set forth above or hereinafter shown or described.

Another object of this invention is to provide a new method of making such a kit, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENTS

Figure 1:
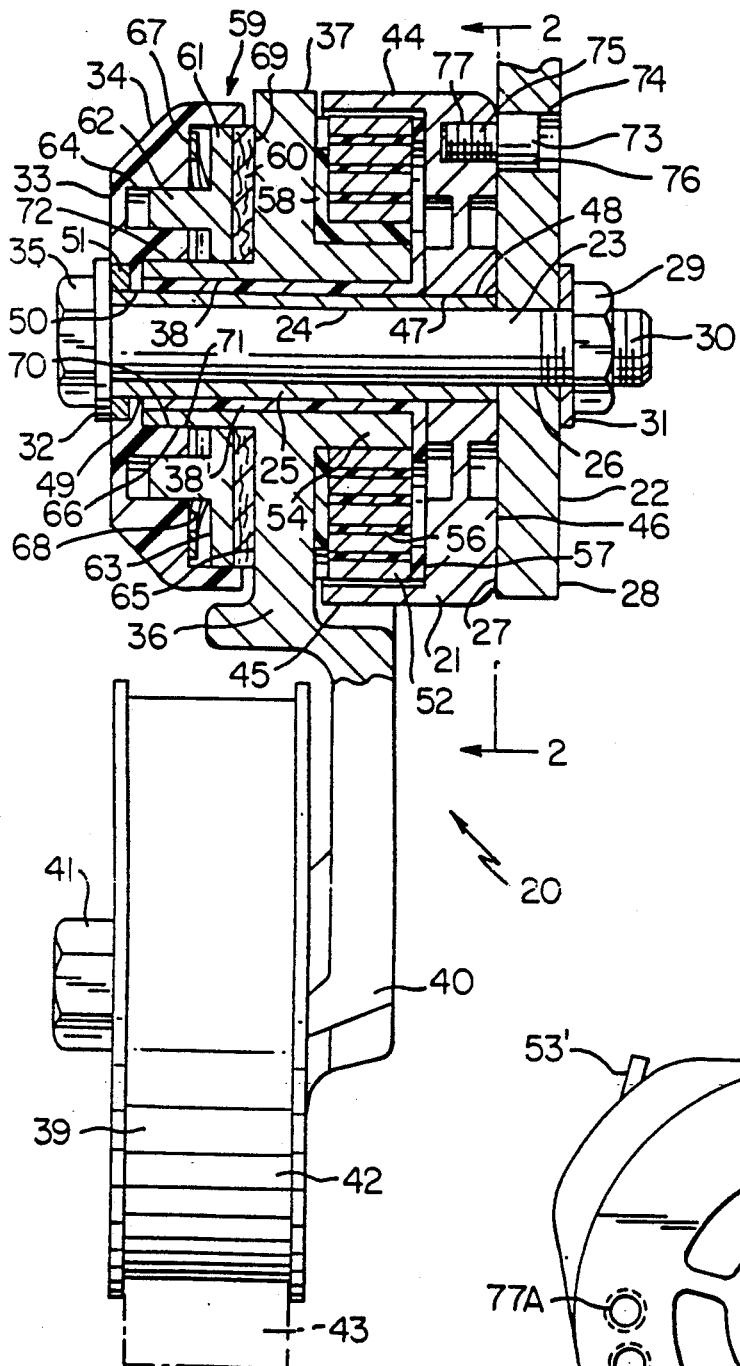
FIG. 1 is an enlarged side view, partially in cross section, illustrating the new belt tensioner of this invention with the same being mounted to a particular support structure.

While the various features of this invention are hereinafter illustrated and described as providing a belt tensioner for particular power transmission belts of particular motor vehicle engines, it is to be understood that the various features of this invention can be utilized singly or in any combination thereof to provide a belt tensioner for other arrangements as desired.

Therefore, this invention is not to be limited to only the embodiments illustrated in the drawings, because the drawings are merely utilized to illustrate one of the wide variety of uses of this invention.

Figure 2:
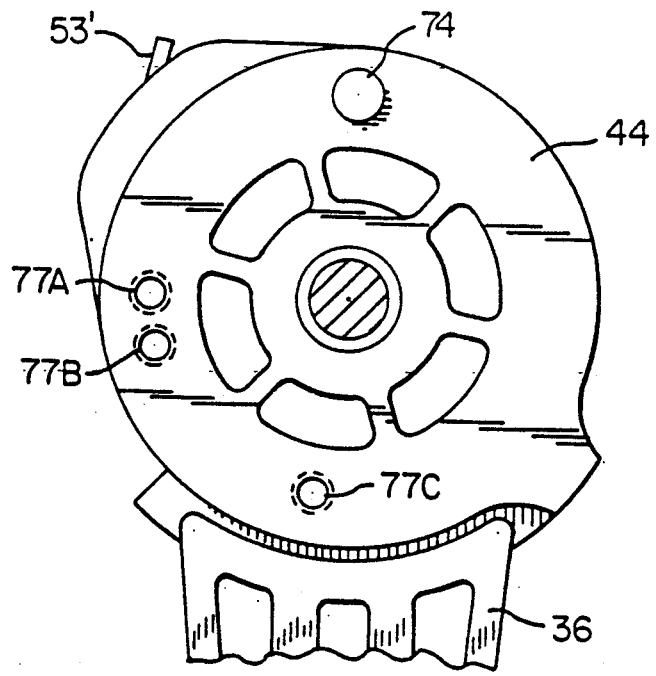
FIG. 2 is a fragmentary cross-sectional view taken on line 2—2 of FIG. 1

Referring now to FIGS. 1 and 2, the new belt tensioner of this invention is generally indicated by the reference numeral 20 and comprises a support means or housing means 21 adapted to be secured to a support means or support bracket 22 of an internal combustion engine (not shown) of a transportation vehicle (not shown) or the like by a single bolt means 23 that is disposed in an opening 24 in a tubular shaft means 25 of the housing means 21 as well as disposed in an aligned opening 26 through opposed surfaces 27 and 28 of the support bracket 22 so as to have a nut 29 threaded on a threaded end portion 30 thereof to compact a washer 31 against the side 28 of the support bracket 22 and another washer 32 against a side 33 of an end cap 34 of the housing means 21 by an enlarged head 35 of the bolt means 23 all in a manner well known in the art.

In particular, the belt tensioner 20 of this invention is generally of the type and structure set forth in the aforementioned U.S. Pat. No. 4,596,538 to Henderson, whereby this patent is being incorporated into this disclosure by this reference thereto.

Therefore, since the details of the structure of the tensioner 20 of this invention and the reason for mounting the same to the support structure 22 is fully set forth in the aforementioned U.S. Pat. No. 4,596,538, to Henderson, only the details of the tensioner 20 of this invention that are deemed necessary to fully understand the unique features and the unique mounting arrangement for mounting the tensioner 20 to the support structure 22 will be hereinafter set forth.

The belt tensioner 20 comprises a belt engaging means or arm 36 formed of metallic material and having a portion 37 rotatably mounted on the shaft means 25, the portion 37 having a cylindrical opening 38 passing therethrough and not only telescopically receiving the tubular shaft means 25 therein, but also telescopically receiving a tubular bearing portion 38' that is telescoped on the tubular shaft means 25 so as to provide a bearing surface for the portion 37 of the belt engaging means 36 as the bearing means 38' is formed of any suitable polymeric material whereas the shaft means 25 is formed of metallic material.

The belt engaging means 36 has a pulley 39 rotatably mounted to an end 40 thereof by a suitable bolt means 41 whereby an annular surface 42 of the pulley 39 is adapted to engage an endless power transmission belt, such as the belt 43 illustrated in dotted lines in FIG. 1, all in a manner well known in the art.

The support means or housing means 21 of the belt tensioner 20 comprises a cup-shaped casing 44 formed of metallic material and having an open end 45 and a closed end 46 that is provided with a central opening 47 therethrough and in which a knurled end 48 of the tubular shaft means 25 is pressed to fasten the end 48 of the shaft means 25 thereto so as to prevent rotation of the shaft means 25 relative to the cup-shaped casing 44 as well as to interconnect the shaft means 25 to the casing 44.

The other end 49 of the shaft means 25 is also externally knurled so as to be fastened directly in a central opening 50 passing through the end cap 34 so as to also prevent rotation of the end cap 34 relative to the shaft means 25 as well as to interconnect the end cap 34 to the shaft means 25.

As will be apparent hereinafter, the end cap 34 of the belt tensioner 20 of this invention is formed substantially entirely of polymeric material for a unique purpose and therefore in order to insure the non-rotation of the end cap 34 relative to the shaft means 25, an annular metallic insert 51 can be molded or otherwise be embedded in the end cap 34 so as to be press fitted onto the knurled end 49 of the shaft means 25 to firmly fasten the end cap 34 to the shaft means 25. For example, the insert 51 can comprise an annular member of aluminum material and is ultrasonically welded into the end cap 34 before the end cap 34 is assembled onto the shaft means 25. Of course, the insert 51 is suitably shaped on its outer periphery to mechanically lock with the remainder of the end cap 34 in its embedded relation therewith.

A coiled metallic torsion spring 52 is disposed in the open end 45 of the casing 44 and has an inner end 53 interconnected to a hub portion 54 of the belt engaging means 36 and an outer end 53' hooked against a projection 55 of the casing 44 so that the torsion spring 52 is interconnected to the housing means 21 and to the belt engaging means 36 to tend to move the belt engaging means 36 and, thus, the belt pulley 39 in a particular direction relative to the shaft means 25 so as to place the belt 43 under tension all in the manner fully set forth in the aforementioned U.S. Pat. No. 4,596,538 to Henderson.

If desired, a strip of polymeric material 56 or any other suitable antifriction material can be interleaved between the coils of the torsion spring 52 and the tubular bearing means 38' can have a disc-like end portion 57 disposed against one side of the coiled spring 52 while another disc-like part 58 of polymeric material or other suitable antifriction material is disposed against the other side of the spring 52 for antifriction purposes.

The belt tensioner 20 includes a frictional dampening means that is generally indicated by the reference numeral 59 in FIG. 1 and comprises an annular pad 60 of brake material that is carried in a non-rotational manner by an annular thrust member 61 that has a plurality of guide members 62 extending from a side 63 thereof and being respectively received in suitable openings 64 formed in the end cap 34 so as to guide axial movement of the friction pad 60 on the shaft means 25 toward and away from an annular flat surface 65 on the belt engaging means 36, the annular pad 60 and thrust member 61 being telescoped on another hub portion 66 of the belt engaging means 36 as illustrated in FIG. 1.

A wavy spring means 67 is disposed in compressed relation between the side 63 of the thrust member 61 and an annular flat surface 68 of the end cap 34 so as to provide a force urging an annular flat side 69 of the friction pad 60 against the surface 65 of the belt engaging means 36 so as to retard rotary movement of the belt engaging means 36 relative to the support means 21 of the belt tensioner 20 for a dampening purpose that is fully set forth in the aforementioned U.S. Pat. No. 4,596,538, to Henderson.

Also, as fully disclosed in the aforementioned U.S. Pat. No. 4,596,538, to Henderson, the end cap 34 thereof is formed of cast aluminum material and thereby requires a separate bearing liner member to provide means for lining the openings thereof that receive the guide projections 62 of the thrust plate 61.

However, as previously stated, it was found according to the teachings of this invention that if the end cap 34 is made substantially entirely of polymeric material, such separate bearing lining means can be eliminated as the material of the end cap 34 itself provides the bearing means for the opening means 64 thereof to readily permit the guide projections 61 of the thrust member 61 to move axially therein.

In addition, it can be seen that the outer end of the hub 66 of the belt engaging means 36 is received in an opening 70 of the end cap 34 that defines an annular surface means 71 that faces an annular surface means 72 on the hub portion 66 of the belt engaging means 36. This arrangement improves corrosion resistance by eliminating lockup between the surfaces 71 and 72 as it was found when the end cap 34 was made of aluminum, the same tended to corrode to the belt engaging means 36 and thereby provide an adverse lockup situation.

Also, it has been found according to the teachings of this invention, that by forming the end cap 34 of polymeric material, the end cap 34 can provide additional clearance in the belt engaging hub area 66 thereof to prevent lockup therebetween.

When the belt tensioner 20 is mounted to the mounting surface 27 of the support bracket 22 by the bolt means 23 in the manner previously described, not only must the housing means 21 be prevented from rotating on the bolt means 23 relative to the support bracket 22, but also the housing means 21 must be initially properly oriented relative to the support bracket 22 so that the pulley 39 will be in the proper position for tensioning the belt 43 as the belt 43 is required to move in a particular path for the engine using the particular support bracket 22 therewith for this purpose.

This feature is accomplished by the housing means 21 having an extension 73 received in an opening means 74 formed in the mounting surface 27 of the support bracket 22 in a particular radial offset relation to the bolt opening 26 thereof for the mounting bolt means 23.

As previously stated, such extensions 73 for a relatively large production run of a particular belt tensioner each normally comprises a cast extension that is integral with the casing 44 for being received in such opening means 74. However, when providing a small amount of prototypes of such tensioners, such extensions 73 each normally comprised a pin means that has a threaded shank portion 75 and an enlarged head or free end 76 while the respective casing 44 has an internally threaded opening 77 formed in the closed end 46 thereof in a proper location so that the resulting pin means 73 can have the threaded shank portion 75 thereof threaded into the threaded opening 77 in the manner illustrated in FIG. 1 so that the enlarged head 76 can be received in the opening 74 of the support bracket 22 to properly orient the tensioner 20 relative thereto as well as to prevent the rotational movement of the housing means 21 relative to the support bracket 22.

As previously stated, it was found according to the teachings of this invention, that when tensioners are provided for different support brackets 22 for different internal combustion engines which required the tensioner to be oriented in different positions than the other support brackets 22, the radial locations for such extensions 73 for a plurality of different support brackets 22 could be marked on the end surface 46 of the casing 44 and then internally threaded openings can be drilled or otherwise formed therein at such locations such as represented by the reference numerals 77A, 77B and 77C in addition to the threaded opening 77 which carries the pin means 73 as illustrated in FIG. 2 for the particular support bracket 22 of FIG. 1.

In this manner, the tensioner 20 can be utilized for a plurality of different support brackets 22 by merely disposing the pin means 73 in the particular opening 77, 77A, 77B or 77C that is required for a particular support bracket whereby one tensioner 20 could be utilized for a plurality of different internal combustion engine arrangements.

Figure 3:
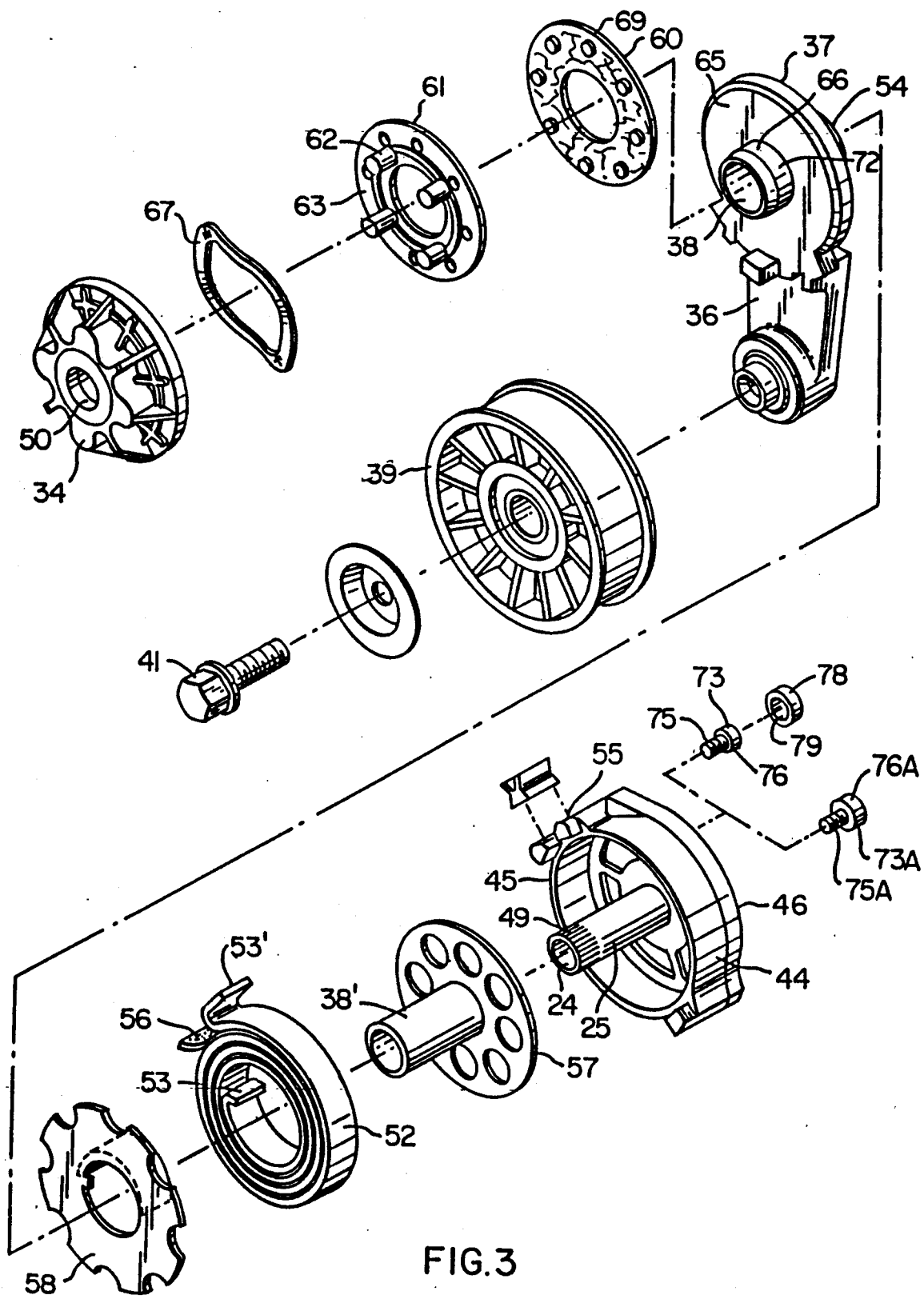
FIG. 3 is an exploded perspective view illustrating the various parts of the belt tensioner of this invention that is illustrated in FIGS. 1 and 2.

It was further found according to the teachings of this invention that since some openings 74 in some support brackets 22 are of a different diameter size, then a different pin means, such as the pin means 73A of FIG. 3, could be utilized for such larger sized openings in the support brackets 22 while the threaded shank portion 75A thereof is of the same diameter as the support pin means 73 previously described. Alternately, a tubular member 78 having an opening 79 therein could be provided to be press fitted over the enlarged head or free end 76 of the pin means 73 so as to enlarge its head size so that a separate pin means 73 with such an enlarged head 76A need not be provided.

Figure 4:
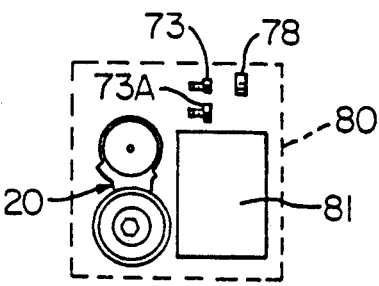
FIG. 4 is a schematic view illustrating the new kit of this invention.

In any event, it was found according to the teachings of this invention that a kit 80, FIG. 4, could be provided for an aftermarket purpose or the like which would include a tensioner 20 of this invention therein as well as the index pin means 73 and 73A and/or adapter 78 along with a set of instructions 81 that would indicate to the user of the kit 80 that if the person's automobile is of a certain make and model, then the index pin 73, 73A or 73 with the adapter 78 is to be threaded in a particular one of the openings 77, 77A, 77B or 77C of the tensioner 20 and then be mounted to the support bracket 22 of this engine by the bolt means 23 so that the tensioner 20 would be properly oriented relative to that support bracket 22 for this particular automobile or vehicle.

Thus, it can be seen that the kit 80 of this invention can be provided to permit a person to utilize the same to mount the tensioner 20 thereof to any one of a plurality of mounting brackets depending upon the particular automobile or vehicle of the user as each opening 77, 77A, 77B or 77C of the tensioner 20 is located at the correct degree and radius from the center line of the shaft means 25 thereof and each opening 77, 77A, 77B or 77C can be properly labeled on the tensioner 20 so as to indicate where the threaded pin means 73 or 73A is to be threadedly inserted according to the instructions 81. In addition spacer plates (not shown) could be included in the kit 80 to correct for greater pulley center lines to mounting surface offset, if desired.

In this manner, the tensioner 20 of this invention can be used for many different engine arrangements by merely selected the proper pin means and the proper opening for that pin means and the instructions 81 will guide the user of the kit 80 in making the proper selection for that person's particular vehicle. Of course, such kits 80 can be used by mechanics or others who service or repair vehicles in a like manner.

Therefore, it can be seen that this invention not only provides a new belt tensioner and method of making the same, but also this invention provides a new kit that contains such a tensioner and method of making such a kit.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In the combination of a support means having a mounting surface means, a single bolt means, and a belt tensioner having a housing means secured to said support means in abutting relation to said mounting surface means thereof by said single bolt means that is carried by said housing means and said support means, said support means having opening means interrupting said mounting surface means in offset relation to said bolt means, said housing means having a certain removable pin means provided with a free end means extending therefrom and being received in said opening means of said support means to orient said tensioner relative to said support means and to prevent rotation of said housing means on said bolt means, the improvement wherein said housing means has a plurality of mounting arrangements each being adapted to have a removable pin means attached thereto for being received in an opening means of a support means, said certain removable pin means being attached to one of said mounting arrangements and having a removable part attached to said free end means thereof so as to be carried thereby and thereby enlarge said free end means to a size that is compatible with said opening means.

2. A combination as set forth in claim 1 wherein said mounting arrangements each comprises an internally threaded opening in said housing means.

3. A combination as set forth in claim 2 wherein said certain pin means comprises an externally threaded shank portion threadedly disposed in its respective internally threaded opening.

4. A combination as set forth in claim 3 wherein each said internally threaded opening in said housing means is adapted to threadedly receive said externally threaded shank portion of said certain pin means.

5. In a belt tensioner having a housing means adapted to be secured to a support means in abutting relation to a mounting surface means thereof by a single bolt means that is carried by said housing means and said support means, said housing means having a certain removable pin means provided with a free end means extending therefrom and being adapted to be received in opening means interrupting said mounting surface means in offset relation to said bolt means to orient said tensioner relative to said support means and to prevent rotation of said housing means on said bolt means, the improvement wherein said housing means has a plurality of mounting arrangements each being adapted to have a removable pin means attached thereto for being received in an opening means of a support means, said pin means having a removable part attached to said free end means of said pin means to be carried thereby and thereby enlarge said free end means to a size that is compatible with said opening means.

6. A belt tensioner as set forth in claim 5 wherein said mounting arrangements each comprises an internally threaded opening in said housing means.

7. A belt tensioner as set forth in claim 6 wherein each said internally threaded opening in said housing means is adapted to threadedly receive an externally threaded shank portion of said certain pin means.

8. In a kit that contains a belt tensioner having a housing means adapted to be secured to a support means in abutting relation to a mounting surface means thereof by a single bolt means that is carried by said housing means and said support means, said housing means being adapted to have a certain removable pin means provided with a free end means extending therefrom and be received in opening means interrupting said mounting surface means in offset relation to said bolt means to orient said tensioner relative to said support means and to prevent rotation of said housing means on said bolt means, the improvement wherein said housing means has a plurality of mounting arrangements each being adapted to have a removable pin means attached thereto for being received in an opening means of a support means, and a pin means in said kit with said pin means being adapted to be attached to any one of said mounting arrangements so as to comprise said certain pin means for a particular support means, a removable part disposed in said kit that is adapted to be attached to said free end means of said pin means to be carried thereby and thereby enlarge said free end means to a size that is compatible with said opening means.

9. A kit as set forth in claim 8 and comprising instruction means in said kit for indicating to which mounting arrangement said pin means is to be attached for a particular support means.

10. A kit as set forth in claim 9 wherein said mounting arrangements each comprises an internally threaded opening in said housing means.

11. A kit as set forth in claim 10 wherein said pin means comprises an externally threaded shank portion adapted to be threadedly disposed in one of said internally threaded openings.

12. A kit as set forth in claim 11 wherein each said internally threaded opening in said housing means is adapted to threadedly receive said externally threaded shank portion of said pin means.

13. A kit as set forth in claim 8 and comprising another pin means in said kit with said other pin means also being adapted to be attached to any one of said mounting arrangements so as to comprise said certain pin means for a particular support means.

14. A kit as set forth in claim 13 and comprising instruction means in said kit for indicating which pin means is to be attached to which mounting arrangement for a particular support means.

15. A kit as set forth in claim 14 wherein said mounting arrangements each comprises an internally threaded opening in said housing means.

16. A kit as set forth in claim 15 wherein each said pin means comprises an externally threaded shank portion adapted to be threadedly disposed in one of said internally threaded openings.

17. A kit as set forth in claim 16 wherein each said internally threaded opening in said housing means is adapted to threadedly receive said externally threaded shank portion of any of said pin means.

* * * * *